(12) United States Patent
Chen et al.

(10) Patent No.: US 9,096,469 B2
(45) Date of Patent: Aug. 4, 2015

(54) EPOXY-MULTILAYER POLYMER RDP GEOPOLYMER COMPOSITIONS AND METHODS OF MAKING AND USING THE SAME

(71) Applicant: Dow Global Technologies LLC, Midland, MI (US)

(72) Inventors: Liang Chen, Midland, MI (US); Chan Han, Midland, MI (US); Dongkyu Kim, Midland, MI (US); Michael J. Radler, Saginaw, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 14/459,364

(22) Filed: Aug. 14, 2014

(65) Prior Publication Data

US 2015/0051312 A1 Feb. 19, 2015

Related U.S. Application Data

(60) Provisional application No. 61/866,140, filed on Aug. 15, 2013.

(51) Int. Cl.
| | |
|---|---|
| *C04B 24/28* | (2006.01) |
| *C04B 14/04* | (2006.01) |
| *C08L 63/10* | (2006.01) |
| *C04B 28/26* | (2006.01) |
| *C04B 24/24* | (2006.01) |
| *C04B 26/00* | (2006.01) |
| *C04B 12/00* | (2006.01) |
| *C04B 40/00* | (2006.01) |

(52) U.S. Cl.
CPC .............. *C04B 28/26* (2013.01); *C04B 12/005* (2013.01); *C04B 14/041* (2013.01); *C04B 14/045* (2013.01); *C04B 24/24* (2013.01); *C04B 24/281* (2013.01); *C04B 26/00* (2013.01); *C04B 40/00* (2013.01); *C08L 63/10* (2013.01)

(58) Field of Classification Search
CPC ...... C04B 24/281; C04B 14/044; C08L 63/10
See application file for complete search history.

(56) References Cited

U.S. PATENT DOCUMENTS

| | | | | |
|---|---|---|---|---|
| 6,346,353 | B1 * | 2/2002 | Wang et al. | 430/14 |
| 7,691,198 | B2 | 4/2010 | Van Deventer et al. | |
| 7,794,537 | B2 | 9/2010 | Barlet-Gouedard et al. | |
| 8,536,250 | B2 * | 9/2013 | Briand et al. | 523/402 |
| 2010/0304165 | A1 | 12/2010 | Han et al. | |
| 2011/0132230 | A1 | 6/2011 | Han et al. | |
| 2012/0094028 | A1 | 4/2012 | Briand et al. | |
| 2012/0329908 | A1 * | 12/2012 | Chen et al. | 523/401 |

FOREIGN PATENT DOCUMENTS

| | | |
|---|---|---|
| CA | 2763509 A1 | 12/2010 |
| CN | 1762884 A | 4/2006 |
| CN | 101250034 A | 8/2008 |
| CN | 101560068 A | 10/2009 |
| CN | 101570036 A | 11/2009 |
| EP | 2407524 A1 | 1/2012 |
| EP | 2537896 A1 | 12/2012 |
| KR | 20020078483 A | 10/2002 |
| KR | 102011057833 A | 6/2011 |
| KR | 1020110057832 A | 6/2011 |
| KR | 101067891 B1 | 9/2011 |
| WO | 2012051522 A1 | 4/2012 |
| WO | 2012177448 A1 | 12/2012 |

* cited by examiner

*Primary Examiner* — Vickey Nerangis
(74) *Attorney, Agent, or Firm* — Andrew E. C. Merriam

(57) ABSTRACT

The present invention provides a two component geopolymer composition of wherein one component comprises a dry mix of an aluminosilicate, such as flyash, geopolymer precursor and one or more epoxy multilayer polymer particle redispersible polymer powder (RDP) having an epoxy resin core and an alkali soluble polymer shell, the epoxy resin having a calculated glass transition temperature ($T_g$) of from 7 to 45° C., and, wherein the other component, comprises one or more alkaline silicate geopolymer precursor, preferably in the form of an aqueous solution. The two-component compositions having from 1 to 20 wt. % of the RDP, based on solids, and provide greater formulation flexibility to make geopolymer compositions having improved tensile strength.

10 Claims, No Drawings

EPOXY-MULTILAYER POLYMER RDP GEOPOLYMER COMPOSITIONS AND METHODS OF MAKING AND USING THE SAME

The present invention relates to two component compositions for making epoxy modified geopolymers. More particularly, it relates to two component compositions comprising a dry mix component of an epoxy multilayer polymer particle redispersible polymer powder (RDP) and an aluminosilicate and an alkali silicate component that comprises water such that the two components when mixed provide a wet mortar that cures to form a geopolymer composition.

The chemistry of Portland cement production and the required high temperature for such production has been identified as a primary contributor to the world's greenhouse gas emissions, ranging 5-8% of all manmade emissions worldwide. As an alternative, geopolymers have been investigated as a supplementary cementing materials that can enable approximately 80% less $CO_2$ emissions. In addition, mortars and concretes prepared from geopolymer binders can exhibit high compressive strength, low shrinkage, high resistance to chemical attack from acids or sulfates and can be superior when compared to those made from Portland cements. Accordingly, geopolymers may have potential as a large-scale replacement for concrete produced from Portland cement.

Geopolymers are generally formed by reaction of two precursors: An aluminosilicate powder with an alkaline silicate solution at ambient conditions. Geopolymers can be made from sources of pozzolanic materials, such as fly ash from coal. Geopolymer containing coatings are often lacking in homogeneous properties, can be brittle in areas and crack easily, exhibit poor flexibility, and adhere poorly to organic substrates.

Recently, a combination of a geopolymer and an emulsion polymer in a coating has been disclosed showing improved compressive strength and adhesion to substrates. In addition to emulsion polymer materials, thermosettable epoxy resins have been proposed that could further improve performance attributes such as corrosion resistance and curing rate. However, epoxy waterborne dispersions exhibit poor compatibility with geopolymer precursors; and the epoxy dispersions are destabilized by geopolymers. Thus, a geopolymer and an epoxy/amine dispersion have to be prepared in separate steps; and, as a result, such materials are usually applied in three packs: Epoxy resin (neat), amine hardener, geopolymer precursor. Such three pack solutions can be difficult to use and mix properly.

Recently, Korean patent no. KR1067891B1, to Hyun et al. has disclosed a crack repairing reinforcing material composition for concrete structures comprising geopolymer (70-90 weight %), a superplasticizer (3-8 weight %), MgO (2-5 weight %), an antifoaming agent (0.1-2 weight %) waterproof agent (0.1-2 weight %), liquid resin (5-30 weight %), which may be acrylic, a silane (1-10 weight %), such as epoxy silane and water (1-20 weight %). The composition comprises as part of the geopolymer caustic alkali (1-10 weight %), and silicate (30-70 weight %) as well as the MgO.

In accordance with the present invention, the present inventors have endeavored to prepare geopolymer composites modified with epoxy resin which avoids the compatibility problems of known epoxy geopolymer compositions and which provides a solution that is easier to use than known three pack solutions.

STATEMENT OF THE INVENTION

1. In accordance with the present invention, two-component compositions for forming a geopolymer comprise a dry mix component of one or more aluminosilicate geopolymer precursor and one or more epoxy multilayer polymer particle redispersible polymer powder (RDP) having an epoxy resin core and an alkali soluble polymer shell, wherein the epoxy resin in the RDP has a calculated glass transition temperature ($T_g$) of 7 to 45° C., preferably, 12.5 to 43° C., and, as a separate component, one or more alkaline silicate geopolymer precursor, the total two-component compositions having from 80 to 99 wt. % of total geopolymer precursors and from 1 to 20 wt. %, preferably, 3 wt. % or more of total epoxy multilayer polymer particle RDP, all weights based on the total weight of solids.

2. Preferably, in item 1, above, the two-component composition comprises the one or more aluminosilicate geopolymer precursor and the one or more alkaline silicate geopolymer precursor in such proportions that the geopolymers resulting from the geopolymer precursors comprise silicon and aluminum in an atomic mole ratio of from 1.63:1 to 5:1, or, preferably, 1.8:1 or greater, or, preferably, 4:1 or less and comprise alkali metals and aluminum in an atomic mole ratio of 0.5:1 and up to 3.5:1, or, preferably, 0.8:1 or more or 1.65:1 or less, all weights based on the total weight of solids.

3. In items 1 or 2, above, the alkaline silicate geopolymer precursor component of the two-component composition further comprises water such that when the two components are combined they form a wet mortar having a water content of from 12 to 30 wt. %, preferably, less than 27 wt. %, or, more preferably, from 15 to 23 wt. %, all weights based on the total weight of the resulting geopolymer, RDP and water in the mortar.

4. Preferably, in items 1, 2 or 3, above, the epoxy multilayer polymer particle RDP further comprises a colloidal stabilizer chosen from polyvinyl alcohol or poly(vinyl pyrrolidinone) or a copolymer thereof, or a mixture thereof; preferably, the colloidal stabilizer is a poly(vinyl pyrrolidinone) or its copolymer.

5. Preferably, in any of items 1, 2, 3, or 4, above, the alkali soluble polymer that comprises the polymer shell of the epoxy multilayer polymer particle RDP has a calculated Tg of 60° C. or higher, preferably from 80° C. to 120° C.

6. Preferably, the alkali soluble polymer of the epoxy multilayer polymer particle RDP in any of items 1, 2, 3, 4 or 5 comprises a chain transfer agent or a divalent metal salt.

7. A wet geopolymer composition comprising the two-component compositions of any of 1, 2, 3, 4, 5 or 6 and water, the two-component compositions having from 80 to 99 wt. % of total geopolymer precursors and from 1 to 20 wt. % of total epoxy multilayer polymer particle RDP, all weights based on the total weight of solids.

8. Preferably, in any of the two-component compositions of 1, 2, 3, 4, 5, 6, or 7, above, the alkali soluble polymer shell of the epoxy multilayer polymer particle is a polymer of methyl methacrylate and methacrylic acid (PMMA/PMAA).

In another aspect of the present invention methods for making a wet geopolymer composition from the two-component compositions of any of items 1 to 6 or 8, above, comprise mixing the epoxy multilayer polymer particle RDP with the aluminosilicate geopolymer precursor to form a dry mix and then adding the alkaline silicate component, preferably, as a solution, to form a mortar.

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "filler(s)" includes, in the alternative, one filler and two or more fillers.

As used herein, the term "aqueous" means water or a mixture of water and up to 50 wt. %, preferably, up to 10 wt. %, or, more preferably, 5 wt. % or less of water miscible solvent(s), based on the total weight of water and the one or more solvent.

As used herein, the term "ASTM" refers to publications of ASTM International, West Conshohocken, Pa.

The particle size distribution was measured using a Coulter™ LS 13-320 laser diffraction particle size analyzer (Beckman Coulter, Brea, Calif.) per manufacturer's recommended procedures via laser scattering. The scattering light from particles through laser scattering and polarization intensity differential scattering is collected as a function of angle, and subsequently converted to a particle size distribution. The phrase "average particle size" means volume-average particle size as determined by laser diffraction according to ISO 13320-2009 using a Coulter Counter particle size and count analyzers.

As used herein, the term "atomic mole ratio" of two atoms in a geopolymer refers to the value determined by totaling the number of moles of each relevant atom in the starting materials used to make the geopolymer, followed by converting that to a ratio of the total number of moles of each atom. For example, in a given aluminosilicate, if it is made from 3 moles of silica and one mole of alumina, then that is converted to 3 moles silicon atoms ($SiO_2$) and 2 moles of aluminum atoms (per mole of $Al_2O_3$), to give a Si/Al atomic mole ratio of 1.5

As used herein, unless otherwise indicated, the term "based on polymer solids" means the epoxy resin composition and the alkali soluble polymer when referring to the multilayer polymer particle.

As used herein, the term "calculated Tg" refers to the glass transition temperature of a (co)polymer as determined by the Fox equation, using temperature values in degrees Kelvin:

$$1/(Tg_{copolymer}) = \Sigma(wf_i/Tg_i)$$

where $Tg_{copolymer}$ is the Tg of the copolymer, $wf_i$ is the weight-fraction of monomer "i" in the (co)polymer and $Tg_i$ is the glass transition temperature of a homopolymer made from monomer "i" and the summation is over all monomers "i".

As used herein, the term "epoxy glass transition temperature (Tg)" or "epoxy resin calculated glass transition temperature (calculated Tg)" for a blend of epoxy resins is determined by the epoxy composition, and is predicted by the Fox equation where "w" is the wt. % of solid epoxy resin in the blend (Tg is calculated in degrees Kelvin):

$$1/Tg = w/Tg_{solid} + (1-w)/Tg_{liquid}.$$

As used herein, unless otherwise indicated, the phrase "glass transition temperature" or "Tg" refers to a calculated Tg.

As used herein, the concept of a glass transition temperature (Tg) of a mixture of colloidal stabilizers is a weighted average of each colloidal stabilizer in the mixture; thus, for example, a mixture of 50 wt. %, the weights based on the total weight of colloidal stabilizers, of a colloidal stabilizer having a Tg of 80° C. and 50 wt. % of a colloidal stabilizer having a Tg of 160° C. would give a mixture of colloidal stabilizers having a Tg of 120° C.

As used herein, unless otherwise indicated, the phrase "molecular weight" refers to the weight average molecular weight as measured by gel permeation chromatography (GPC) against poly(styrene) standards.

As used herein, the term "multilayer polymer particle" refers to polymer particles having two or more layers associated with one another including by any of chemical grafting, encapsulation, or physical adsorption (physiadsorption).

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer. Thus, the term "polymer" includes copolymers and polymers within its scope.

As used herein the term "total RDP weight" refers to polymer, colloidal stabilizer, and any additive solids in the RDP powder.

As used herein, the term "wt. %" stands for weight percent.

In accordance with the present invention, an epoxy RDP containing geopolymer precursor dry mix component comprises a dry blend of aluminosilicate and RDP intimately mixed before adding, as a separate component, aqueous alkaline silicate solution or the alkaline silicate as a powder and water. Upon addition of alkaline silicate water or solution component to the dry mix component, a geopolymer mortar is formed which when cured showed significantly improved compressive strength and reduced cracking when cured. Moreover, the invention enables a further increase in strength after water exposure, which was not attainable previously. The redispersible epoxy multilayer polymer particle powder with an alkali soluble polymer shell enables good distribution of the epoxy resin in geopolymer and in addition enhances film formation and the curing of the prepared composite. The compositions of the present invention also exhibit improved curing within a wider formulation window than known geopolymer forming compositions, such that adding more water to enable processing will now have less of an adverse impact on the cured material properties of geopolymer compositions.

Geopolymers can be any inorganic materials having polymeric Si—O—Al (sialate) bonds and containing alkali metals. Geopolymers may be obtained from the inorganic polymerization reaction between alumino-silicate oxides and alkali(ne) silicates, which are two components. Their network, composed of $SiO_4$ and $AlO_4$ tetrahedra, is linked through the oxygen bonds in a four coordinate structure. The $Al^{3+}$ in the 4-fold coordination creates a local charge deficit that must be balanced by the presence of cations, such as $Na^+$, $K^+$, and $Ca^{2+}$ in the network cavities. The empirical formula of geopolymers thus can be represented as follows:

$$M_n[-(SiO_2)_z-AlO_2]_n \cdot wH_2O$$

wherein M is a monovalent cation such as $K^+$, $Na^+$, $Ca^{2+}$; n represents the degree of polycondensation; and Z could be 1, 2, or 3.

Suitable geopolymers made and used in the present invention can be represented by the average Formula I:

$$(M)_y[-(-SiO_2)_z-AlO_2]_x \cdot wH_2O \quad \text{(Formula I)}$$

wherein each M independently is a cation of Group 1 of the Periodic Table of the Elements, preferably Na or K; x is an integer of 2 or higher and represents the number of polysialate repeat units; y is a number selected so that a ratio of y to x is (y/x) is 0.5 or greater, and, preferably, from 0.9 to less than or equal to 4 (0<y/x≤4); z is a number of from 1 to 35; and w is a number such that ratio of w to x (w/x) represents a ratio of moles of water per polysialate repeat unit. The z represents a molar ratio equal to moles of silicon atoms to moles of aluminum atoms (Si/Al) in the polysialate. The distribution of the $SiO_2$ functional groups in the geopolymer may be characterized as being random. Thus, z can be a rational or irrational number. Unless otherwise noted, the phrase "Periodic Table of the Elements" refers to the official periodic table, version dated Jun. 22, 2007, published by the International Union of Pure and Applied Chemistry (IUPAC).

In the geopolymer of Formula I, the w is preferably chosen to give a "geopolymer viscosity effective amount" of water, which means a quantity of water sufficient to establish a desired resistance to flow for the geopolymer composition to give the improved cure strength and formulation flexibility. To give a desired geopolymer viscosity effective amount of water, w can be adjusted higher or lower by adding water to or removing (such as by drying) some water from the stabilized geopolymer composition.

Preferably, the geopolymer has an average Formula I, such that each M independently is a cation of Group 1 of the Periodic Table of the Elements; x is an integer of 2 or higher; y is an integer selected so that a ratio of y to x (y/x) is from 0.9:1 to 4:1; z is a number of from 1.63 to 5, or, more preferably, 1.7 or higher or 3.0 or less, or, even more preferably, 2.0 less; and w is such that the water content of a wet mortar composition of the geopolymer precursors and the redispersible powders of the present invention remains at or below 30 wt. %, based on water, geopolymer and redispersible powder solids.

In the geopolymers of the present invention, the cation M is provided as a separate component of an alkaline silicate either in the form of a powder or an aqueous solution. Common cations may comprise, for example, potassium (K+), sodium (Na+), lithium (Li+), or a combination of two or more thereof. The cations may alternatively comprise cations of one or more metals of Group 2 of the Periodic Table of the Elements, more preferably magnesium cation ($Mg^{+2}$), and still more preferably calcium cation ($Ca^{+2}$); however, preferably, the calcium cation does not comprise, and is not derived from, a calcium oxide. Preferably, at least 51 mol %, more preferably at least 90 mol %, still more preferably at least 98 mol %, and even more preferably at least 99 mol % of M are Na+ and the alkaline silicate is water glass.

In the geopolymers of the present invention, the aluminosilicates, part of the dry mix component, may comprise any known aluminosilicates having the requisite atomic mole ratio of Si:Al. These can include, for example, blast furnace slag, fly ash, such as class C and class F fly ash, feldspar, pozzolans and metakaolin. Class C fly ash has more alkalinity than Class F fly ash, and their blends may preferably be used. Aluminosilicates preferably include Class F flyash (a pozzolanic material from anthracite and bituminous coal that contains less than 20 wt. % CaO, such as PV-14A, Boral Materials Technologies, Mt. Pleasant, Tex.), Class-C flyash (a pozzolanic material from lignite or subbituminous coal that contains more than 20 wt. % CaO, some alkali and sulfate), and, more preferably, mixtures thereof. See also http://en-.wikipedia.org/wiki/Pozzolan.

Suitable epoxy multilayer polymer particle redispersible polymer powders (RDP) for use in the present invention may be any multilayer polymer particles of epoxy resin compositions having an alkali soluble polymer shell around the epoxy resin, such that the epoxy resin compositions have a calculated glass transition temperature (Tg) of from 7 to 45° C., preferably from 12.5 to 43° C. Epoxy resin having too high a $T_g$ may not form a film; and epoxy resin having too low a $T_g$ may be tacky and fail to form a powder form RDP.

Preferably, the epoxy multilayer polymer particle redispersible polymer powder of the present invention has from 50 to 90 wt. %, preferably, from 60 to 85 wt. %, based on total polymer solids, of epoxy resin compositions and from 10 to 50 wt. %, or, preferably, 25 to 50 wt. % based on epoxy solids, of an alkali soluble polymer shell around the epoxy resin.

Preferably, the epoxy core of the epoxy multilayer polymer particle is a blend of two epoxy resins, having a calculated glass transition temperature (Tg) of from 7 to 45° C., preferably from 12.5 to 43° C.

Preferably, the polymer shell of the epoxy multilayer polymer particle of the present invention is the copolymerized product of from 10 to 50 wt. %, or, preferably, from 20 to 50 wt. % of methacrylic acid or its anhydride, based on total weight of monomers copolymerized to form the alkali soluble polymer shell, and the remainder of one or more ethylenically unsaturated comonomer and one or more chain transfer agent.

Preferably, the alkali soluble polymer shell of the epoxy multilayer polymer particle comprises in copolymerized form from 0.1 to 10 wt. %, or, preferably, from 1 to 5 wt. % total, based on the total weight of ethylenically unsaturated monomers copolymerized to form the polymer shell, of one or more hydrophobic chain transfer agent, such as, for example, n-dodecyl mercaptan.

Preferably, the redispersible polymer powder (RDP) of the epoxy multilayer polymer particle comprises from 3 to 25 wt. %, based on the total weight of epoxy resin, alkali soluble polymer and colloidal stabilizer solids, or, preferably, from 5 wt. % to 15 wt. % of one or a mixture of colloidal stabilizers having a measured glass transition temperature (Tg) of 80° C. or more, or, more preferably, 120° C. or more, or, more preferably, from 140° C. (iii) to 200° C. Tg is measured by Differential Scanning calorimetry (DSC) at a temperature ramp rate of 10° C./min and taking the midpoint of the inflection of the curve as the Tg.

Suitable epoxy resins for use in the present invention have at least 2 glycidyl groups and may include aliphatic, araliphatic and aromatic epoxy compounds which are polyglycidyl ethers of a polyol, such as a hydroxyl-functional oligomer. Such epoxy resins groups and are the reaction products of a polyol, such as a glycol, or a hydroxyl-functional oligomer, with an epihalohydrin, such as epichlorohydrin. Such preparations are well known in the art (see for example U.S. Pat. No. 5,118,729, columns 4-7 and "Epoxy resins" by Pham, H. Q. and Marks, M. J. in Ullmann's Encyclopedia of Industrial Chemistry, Wiley-VCH Verlag, Weinheim, 2005).

Examples of suitable polyols include polyhydric phenols and polyhydric alcohols. Specific non-limiting examples of monomeric polyols are resorcinol, catechol, hydroquinone, bisphenol, bisphenol A, bisphenol AP (1,1-bis(4-hydroxylphenyl)-1-phenyl ethane), bisphenol F, bisphenol K, 4,4'-sulfonyldiphenol, 4,4-oxydiphenol, 4,4'-dihydroxybenzophenone, 9,9'-bis(4-hydroxyphenyl)fluorine, and 4,4'-dihydroxybiphenyl. Examples of hydroxyl-functional oligomers include phenol-formaldehyde novolak resins, alkyl substituted phenol-formaldehyde resins, phenol-hydroxybenzaldehyde resins, cresol-hydroxybenzaldehyde resins, dicyclopentadiene-phenol resins, and dicyclopentadiene-substituted phenol resins. Suitable polyols for making the epoxy resin can be substituted, if desired, with one or more non-interfering substituents, such as halogen atoms, ether radicals, lower alkyls and the like. An oligomeric or polymeric compound such as a phenol-formaldehyde novolac may be used as the polyhydroxy compound.

Preferably, the polyol used to prepare the epoxy resin is an aromatic dihydroxy compound, such as bisphenol A and/or bisphenol F.

Preferred examples of epoxy resins for use in the present invention include the diglycidyl ether of bisphenol A, such as the be condensates of bisphenol A and epichlorohydrin or methylepichlorohydrin; the diglycidyl ether of bisphenol F; a mixed diglycidyl ether of bisphenol A and F; the diglycidyl ether of a phenol-formaldehyde novolak; and modified epoxy resins such as epoxy resins, e.g. bisphenol A epoxy resins, modified with an epoxy functional surfactants, such as, for example, epoxy functional nonionic or epoxy functional anionic surfactant, and/or poly(alkylene glycol) epoxide, typically poly(propylene glycol) epoxide or poly(ethylene glycol) epoxide. The epoxy resin can be and desirably is free of sulfur.

One suitable epoxy resin is a linear, non-cross-linked polymer of bisphenol A and epichlorohydrin having terminal epoxide groups. A specific example of a suitable epoxy resin which may be employed herein is D.E.R.™ 664U, a solid epoxy resin of medium molecular weight, which is the solid reaction product of epichlorohydrin and bisphenol A, having a softening point of 100° C. to 110° C. (The Dow Chemical Company, Midland, Mich.).

The epoxy dispersions of the present invention may be made by mechanically dispersing with shearing the epoxy resin into an aqueous medium to form the initial epoxy resin dispersion, such as by feeding the two through a high shear mixer that disperses one phase into the other. The epoxy resin may be softened, such as, for example, by heating it to a temperature higher than its Tg, if needed, and combining it with an aqueous phase under shear. Such methods are taught, for example, in U.S. Pat. No. 4,123,403.

In mechanical dispersion, if a high internal phase dispersion of epoxy resin in aqueous phase is produced (internal volume is greater than 74% of total emulsion volume), it can be diluted down with additional aqueous phase if desired to, for example, reduce viscosity of the dispersion. Mechanical dispersion can produce dispersions with dispersed particles having a highly uniform particle size (narrow particle size distribution) that can be two μm or less, or, preferably, one μm or less. The epoxy resin particles in the initial epoxy resin dispersion desirably have a particle size of 5 μm or less, preferably, 2 μm or less, or, more preferably 1 μm or less, or, yet more preferably 750 nm or less. Generally, smaller particles require higher shear to form.

Suitable shearing methods include extrusion and melt kneading in a known manner including, for example, in a kneader, a Banbury mixer, single-screw extruder, or a multi-screw extruder. A preferred melt-kneading machine is, for example, a multi screw extruder having two or more screws, to which a kneading block can be added at any position of the screws. If desired, an extruder may be provided with a first material-supplying inlet, such as for the epoxy resin, a second material-supplying inlet, such as for and any dispersant, and, further, if desired, third and forth material-supplying inlets in this order from the upstream to the downstream along the flow direction of a material to be kneaded. Further, a vacuum vent may be added.

Preferred shearing devices include a multi screw extruder having two or more screws for continuous processing, and rotor stator mixer and pressurized high shear device for batch processing.

Mechanically dispersing the epoxy resin into the aqueous phase can comprise a batch, semi-continuous or continuous process. Batch processes include preparing the epoxy resin dispersion in a single container by adding the aqueous phase and epoxy resin together while mixing.

Preferably, a continuous shearing method comprises mixing both aqueous phase and epoxy resin in a continuous stream to produce the initial epoxy resin dispersion, such as in a multi-screw extruder.

Suitable epoxy resins having a Tg of 45° C. or lower, especially those with a Tg of 35° C. or lower, 30° C. or lower are more readily softened for forming the initial epoxy resin dispersion without requiring further heating or softening of any other kind. The aqueous phase is preferably water.

Preferably, to enable fine tuning of their Tg, epoxy resins can be blends of low and higher molecular weight epoxy resins as well as epoxy resins that are liquid at ambient temperature.

Preferably, the epoxy resin is free of plasticizer.

Preferably, the initial epoxy resin dispersion is formed in the absence of any organic solvent which means that it contains less than 1000 ppm, or preferably, less than 500 ppm of such a solvent. Organic solvents exclude fugitive plasticizers and monomers.

Preferably, a dispersing agent may be used to prepare the initial epoxy resin dispersion. The dispersing agent can be added to the epoxy resin or directly to the aqueous phase prior to dispersing the epoxy resin, or added to the initial epoxy dispersion as the epoxy resin and aqueous phase are being mixed. Suitable dispersing agents for stabilizing the initial epoxy resin dispersion include any colloidal stabilizers taught above with regard to the epoxy RDP, such as, for example, polyvinyl alcohol (PVOH). Suitable amounts of dispersing agent in the initial epoxy resin dispersion are 15 wt. % or less, preferably, from 4 to 10 wt. % based on total epoxy resin weight.

The alkali soluble polymer shell around the epoxy resin in the multilayer polymer particle RDP of the present invention may prevent incompatibility of epoxy resin and geopolymer precursors, thereby precluding irreversible agglomeration of particles.

The monomers used to make the alkali soluble polymer are selected so as to form an alkali soluble polymer shell having a calculated glass transition temperature (Tg) of 60° C. or higher, preferably 75° C. or higher, still more preferably 90° C. or higher, even more preferably 100° C. or higher, or up to 120° C. It is desirable for the alkali soluble polymer shell to have a higher Tg to resist irreversible agglomeration of particles during isolation of the epoxy RDP particles, particularly in the presence of components such as dispersing agents that might plasticize the alkali soluble polymer shell.

The alkali soluble polymer shell comprises the copolymerization product of 5 or more wt. % and up to 50 wt. %, preferably 10 wt. % or more, or, more preferably, 15 wt. % or more, and yet more preferably, 20 wt. % or more of monomers selected from methacrylic acid and anhydride monomers, based on the total weight of monomers polymerized to form the alkali soluble polymer shell, with the remainder one or more copolymerizable ethylenically unsaturated monomers. As concentrations of carboxylic acid or anhydride monomer range further below about 50 wt. %, the alkali soluble polymer will comprise the reaction product of some hydrophilic monomoner(s) to insure that the polymer is alkali soluble.

Suitable hydrophilic monomers, where needed, may comprise hydroxyalkyl esters of a carboxylic acid or (meth)acrylamide. Useful amounts of such hydrophilic monomers may range from zero to 30 wt. % based on the total weight of monomers polymerized to form the alkali soluble polymer shell, or, preferably from 5 to 20 wt. %.

The remaining copolymerizable ethylenically unsaturated monomers used to form the alkali soluble polymer shell are desirably chosen from alkyl methacrylates, such as, for example, 2-ethylhexyl methacrylate, methyl methacrylate, ethyl methacrylate, butyl methacrylate, and fatty alkyl methacrylates, such as lauryl methacrylate. Such monomers may comprise 30 to 95 wt. % of monomers, based on the total weight of monomers polymerized to form the alkali soluble polymer shell.

The copolymerizable ethylenically unsaturated monomers can further comprise up to 25 wt. %, preferably up to 10 wt. %, based on the total weight of monomers used to make the copolymer, of one or more other nonionic monomers, such as vinyl aromatic monomers like styrene or alkyl substituted styrene.

Preferably, the nonionic monomers comprise hard hydrophobic monomers, such as vinyl aromatic monomers to improve the shell stability.

A chain transfer agent may be used to improve the shelf stability of the alkali soluble polymer. Suitable chain transfer agents for use in making epoxy multilayer polymer particles may include any mercaptans. Any chain transfer agent can be mixed into a monomer emulsion or, separately, into the epoxy dispersion. The chain transfer agents can be charged or metered by gradual addition, preferably, added in one shot.

Preferably, hydrophobic chain transfer agents are used, including $C_6$ to $C_{18}$ alkyl, cycloalkyl or alkylaryl group containing thiols or mercaptans, or, preferably, $C_8$ or higher alkyl, cycloalkyl or alkylaryl group containing thiols or mercaptans, such as, for example, n-dodecyl mercaptan a fatty thiol. More preferably, such $C_8$ or higher alkyl, cycloalkyl or alkylaryl group containing chain transfer agents have a single sulfur atom.

The ethylenically unsaturated monomer mixture of the alkali soluble polymer shell of the present invention is polymerized by conventional emulsion polymerization, optionally, with heating. Reactants include one or more catalysts fed into the reaction vessel, and include a monomer mixture as one monomer feed (i.e. gradual addition polymerization), or two or more monomer feeds which can be sequential feeds, overlapping in time or simultaneous to one another.

Preferably, epoxy seeded emulsion polymerization combines all of an ethylenically unsaturated monomer mixture (as one or more feed) with an already formed initial aqueous epoxy resin dispersion before or during their polymerization.

Suitable addition polymerization catalysts include thermal and/or redox triggered free radical initiators, preferably, that are water soluble. Examples of suitable thermally triggered initiators include peracid salts, such as alkali metal persulfate salts, such as, for example, sodium persulfate; or ammonium persulfate. Suitable redox initiators include combinations of oxidizing agents (such as persulfate salt and organic peroxides) and reducing agents (such as sodium formaldehyde sulfoxylate) and a redox catalyst such an iron (II) sulfate.

The amount of free radical initiator is generally 0.01 wt. % or more, preferably 0.1 wt. % or more while at the same time is generally 2 wt. % or less, based on the total weight of ethylenically unsaturated monomers used to make the alkali soluble polymer shell.

The weight-average molecular weight of the alkali soluble polymer shell may range from 2,500 grams per mole (g/mol) to 500,000 g/mol or less, or 250,000 g/mol or less, or, preferably, 5,000 g/mol or more, or, preferably, 50,000 g/mol or less. An excessively high molecular weight can causes a viscosity buildup at and alkaline pH, thereby leading to handling problems.

Preferably, the alkali soluble polymer shell comprises copolymers of methacrylic acid and methyl methacrylate. In such a copolymer, the concentration of copolymerized methacrylic acid 10 wt. % or more, preferably 15 wt. % or more preferably 20 wt. % or more while at the same time desirably being 50 wt. % or less. The balance of the copolymer is copolymerized methyl methacrylate.

The concentration of alkali soluble polymer shell can be equal to or less than the concentration of epoxy resin and preclude irreversible agglomeration of the epoxy RDP particles. The concentration of the alkali soluble polymer shell may range less than 50 wt. %, and at the same time should range 10 wt. % or more, or, preferably, 15 wt. % or more, or, still more preferably 20 wt. % or more relative to the total weight of the epoxy resins in the multilayer polymer particle RDP.

Removing the aqueous phase and isolate the resulting RDP particles can be done any number of ways including freeze drying or spray drying (atomization), or a combination of both. Such removing of the aqueous phase is conventional in the art and is as described, for example, in US 2011/0160350A1 by Bergman et al.

Preferably, drying the aqueous admixture comprises spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 140° C. to 170° C. The outlet temperature may generally be from 30° C. to 100° C., preferably from 50° C. to 80° C., depending on the plant, the Tg of the resin and the desired degree of drying. The solids content of the admixture to be spray-dried may generally be from 25% to 60% by weight, preferably from 35% to 50% by weight, based on the total weight of the dispersion.

A colloidal stabilizer or a dispersing agent can be added while feeding and polymerizing the ethylenically unsaturated monomer mixture, while removing the aqueous phase from the multilayer polymer particle RDP particles, or both. Colloidal stabilizer added when spray drying should facilitate redispersion of the RDP particles when the RDP particles are added to an aqueous medium. It is particularly desirable to add a colloidal stabilizer to the RDP particles during the spray drying process.

Suitable colloidal stabilizers may include one or more of cellulosic thickeners, such as hydroxypropyl cellulose, or hydroxyethyl methyl cellulose; polymers of methyl vinyl ether, water soluble copolymers of ethylenically unsaturated carboxylic acids, such as (meth) acrylic acid or its salts, or preferably a poly(vinyl pyrrolidinone), including its copolymers, a polyvinyl alcohol (PVOH), a partially hydrolyzed PVOH, or any mixture of colloidal stabilizers containing at least 25 wt. % of poly(vinyl pyrrolidinone), based on the total weight of colloidal stabilizers.

Suitable amounts of the colloidal stabilizer may range 2 wt. % or more, or, preferably, wt. % or more, or, still more preferably, 7 wt. % or more, and can be present at a concentration of 10 wt. % or more, or up to 25 wt. % or less, or, preferably 20 wt. % or less, or, more preferably, 15 wt. % or less based on the total RDP polymer weight including the colloidal stabilizer, and any other additives. Preferably, the desired concentration of colloidal stabilizers added during the spray drying process may range from 5 to 15 wt. % relative to total epoxy resin and alkali soluble polymer solids.

Preferably, to help prevent irreversible agglomeration of the epoxy multilayer polymer particle RDP of the present invention includes one or more anti-caking agent to improve powder flowability used when spray drying the polymer aqueous dispersion to isolate the multilayer polymer particles. The anti-caking agent can be added in any manner including mixing in with the dispersion prior to spray drying or mixing with the dispersion while spray drying by, for example, blowing into to a chamber with the dispersion.

Suitable anti-caking agents include mineral filler such as calcium carbonate, kaolin, barium sulphate, titanium oxide, talc, hydrated alumina, bentonite, calcium sulphoaluminate and silica.

Suitable amounts of anti-caking agent in the range 50 wt. % or less, or, preferably, 20 wt. % or less, or, more preferably, 15 wt. % or less, or, still more preferably, 10 wt. % or less, or, even more preferably, 5 wt. % or less relative to total RDP weight including colloidal stabilizer and additive solids. The RDP can be free of anti-caking agent, but generally contains 0.5 wt. % or more, or, preferably, 2 wt. % or more, or, more preferably, 5 wt. % or more relative to total RDP weight.

Preferably, divalent metal ions ($M^{2+}$) having a pKa (in water) of 9.55 or more and up to 30, preferably, 9.59 or more, preferably Zn, Ba, Mg or Ca, or their strong acid (acid pKa ≤3.5) or organic acid salt, e.g. acetates, succinates and citrates, preferably, a strong acid salt having a pH in water at a concentration of 1 wt. % of 7.0 or less, such as chlorides, sulfates or phosphates, e.g. $CaCl_2$, may be used as additives to aid in the redispersibility of the RDPs. In suitable amounts, the molar ratio of $M^{2+}$ ions to the carboxyl acid groups in the alkali soluble polymer shell is from 10 to 200 mole %, preferably, from 25 to 100 mole %.

An amine hardener may be added as a third component or in the alkaline silicate geopolymer precursor component to cure the epoxy resins in alkaline conditions.

Preferably, the geopolymers of the present invention are made by combining as a dry mix component the one or more epoxy multilayer polymer particle RDP and the one or more aluminosilicate, and then adding an alkaline (e.g. sodium) silicate solution component in water to the dry mix to form a homogeneous mixture which provides a alkaline solution needed for the epoxy to crosslink.

The following examples illustrate the present invention. Unless otherwise indicated, pressure and temperature are standard pressure and room temperature (RT).

EXAMPLES

TABLE 1A

Raw Materials

| Commercial name | Chemical nature | Function | Supplier | EEW (g/eq) | Mw (g/mol) |
|---|---|---|---|---|---|
| D.E.R.™,[1] 331 | diglycidyl ether of bisphenol A | Liquid epoxy resin | Dow | 182-192 | 380 |
| D.E.R.™,[1] 661 | | Solid epoxy resin | Dow | 500-560 | 1500 |
| D.E.R.™,[1] 667E | | Solid epoxy resin | Dow | 1600-1950 | 10000 |
| D.E.R.™,[1] 669E | | Solid epoxy resin | Dow | 2500-4000 | 15000 |
| E-SPERSE™,[2] 100 | PEO (14) di- and tristyrenated Phenol ammonium sulfate | Dispersant | Ethox Chemicals | — | — |
| MOWIOL™,[3] 4-88 | Polyvinyl alcohol | Dispersant | Kuraray | — | 31000 |

EEW: epoxy equivalent weight (gram/equivalent);
Mw: weight average molecular weight determined by GPC based on polystyrene standards;
[1] Dow Chemical Co., Midland, MI;
[2] Ethox Chemicals, LLC, Greenville, SC;
[3] Kuraray Europe GmbH, Hattersheim, Germany.

Epoxy blend dispersions were prepared in a PARR reactor in a batch-wise dispersion process. A 300 mL PARR stainless steel pressure reactor (Parr Instrument Co.) with a 66.675 mm (2.625") inside diameter and a Cowles blade, equipped with a pulley system to allow mixer speeds of up to 1825 rpm was used. To make the dispersions 50.0 g of the indicated epoxy resin and the indicated amounts of the indicated dispersants listed in Table 1, below, were charged into the PARR reactor. The stirrer assembly was inserted into the vessel. The PARR reactor assembly was then loaded onto its ring stand and water hoses were attached to the stirrer's cooling sleeve. The thermocouples and stirrer motor were connected, and the heating mantle was lifted into place and tightened. With this mixer setup, the reactor was sealed and heated to 100° C., and the mixture was stirred for 10 minutes to allow sufficient mixing of the epoxy resin and the dispersant at full mixing speed. To this mixture water was added using a HPLC pump at a rate of 1 mL/min for 20 minutes. The water addition rate was increased to 10 mL/min for 3-4 minutes while the heating mantle was removed and the PARR reactor was cooled down to room temperature. The resultant dispersion was collected by filtration through a 200 μm filter.

TABLE 1

Summary of Waterborne Epoxy Dispersions

| Dispersion | Epoxy or blend (pbw) | Dispersant (pbw) | Co-dispersant | Solids in dispersion (wt. %) | $V_{mean}$ (μm)[1] |
|---|---|---|---|---|---|
| A | D.E.R. 661 Tg = 41° C. 100 part | MOWIOL 488 10 part | None | 39.18 | 0.323 |
| B | DER667E/DER331 (55/45); Tg = 20° C. 100 part | MOWIOL 488 6.2 part | E-SPERSE 100 2 part | 55.0 | 0.360 |
| C | DER669E/DER331 (33/67); Tg = 5° C. 100 part | MOWIOL 488 10 part | None | 43.2 | 0.220 |

[1] Volume average particle diameter with a Beckman Coulter LS 13 320 Laser Light Diffraction Particle Size analyzer (Beckman Coulter, Inc., Brea CA), using an epoxy resin model predetermined by the instrument software.

For each dispersion of epoxy resins with alkali soluble acrylic polymers listed in Table 2 below, epoxy dispersion seeded emulsion polymerization of the indicated acrylic monomers was conducted. All polymerizations were conducted by charging into a round bottom flask reactor the indicated amount as solids of the epoxy dispersion and purging with nitrogen gas while maintaining at 60° C. While stirring the reactor contents, polymerization comprises adding catalyst (adding 10 mg of ferrous sulfate as a 1 wt. % aqueous solution) to the reactor and, separately, premixing the indicated monomers in the proportions indicated in Table 2, below, and injecting the resulting monomer mixture into the reactor over 60 minutes. At the same time, a feed of a redox catalyst pair (in dispersion D, using, for each 36 g of epoxy solids, 2.16 g of 2.5 wt. % of an aqueous solution of tart-butyl peroxide, and separately 2.16 g of 2.5 wt. % aqueous solution of sodium hydroxymethanesulfinate was added over 90 min as a free radical initiator so as to add a total of 0.75 wt. % solids of each catalyst component relative to total acrylic monomer solids weight into the reactor. After maintaining the reaction at 60° C. for 90 min, the mixture was then allowed to cool to 25° C. and was filtered through a 190 μm filter. The resulting dispersion comprises, for example, in dispersion D, epoxy resin particles containing 20 wt. % alkali soluble shell comprising a copolymer of methacrylic acid and methyl methacrylate, based on the weight of the epoxy resin.

TABLE 2

Summary of Epoxy Multilayer Polymer Particle Dispersions

| Dispersion[1,2] | Epoxy or Epoxy Blend (pbw) | Dispersant | ASR shell[3] | $V_{mean}$ (μm) |
|---|---|---|---|---|
| D | DER661 Tg = 40° C. 100 part | MOWIOL ™ 488 10 part | PMMA— PMAA (4:1) 20 part | 340 |
| E | DER667E/DER331 (55/45); Tg = 20° C. 100 part | MOWIOL ™ 488 10 part E-SPERSE 100 2 part | PMMA— PMAA (4:1) 25 part | 378 |
| F | DER669E/DER331 (33/67); Tg = 5° C. 100 part | MOWIOL ™ 488 10 part | PMMA— PMAA (4:1) 30 part | 240 |

[1]Dispersions D, E, and F were prepared, respectively, from dispersions A, B and C. Initiator concentrations are the same in all dispersions, each of SFS and t-BuOOH is 0.75 wt. % based on total acrylic monomer weight;
[2]For dispersion E, additional PVOH was added into the dispersions after polymerization to arrive at a total of 10 weight parts PVOH, based on epoxy resin solids.
[3]PBW, based on total epoxy solids weight.

To spray dry each dispersion, a two-fluid nozzle atomizer was equipped on a MOBILE MINOR™ 2000 Model H spray dryer (GEA Niro, Denmark). The air pressure to nozzle was fixed at 760 mm/Hg (1 bar) with 50% flow which is equivalent to 6.0 kg/hour of air flow. A glass jar was placed under the cyclone with the valve on the bottom of the cyclone open. Each of the aqueous dispersions from Table 2 (about 35-40 wt. % solids content) was pumped into a heated chamber by an emulsion feed pump (from Cole-Parmar Instrument Company, Vernon Hills, Ill.). The spray drying was conducted in an $N_2$ environment with an inlet temperature fixed at 140° C., and the outlet temperature was targeted at 50° C. by tuning the feed rate of the dispersion (feed rate=20-30 mL/min). Simultaneously with the dispersions, kaolin clay powder (KaMin™ HG-90, LLC, Macon, Ga.) was fed into the chamber as an anti-caking agent at 1.0 g/min (total Kaolin clay in the spray dried powder is approximately 10 wt. %, based on total powder weight). The polymer dispersion was atomized using high air pressure at the nozzle atomizer, while the vacuum fan constantly pulled nitrogen/moisture through the filter, and most of the dry powder was recovered in the glass jar attached on the cyclone. The residual polymer powder having an approximate average particle size of between 10 and 40 μm as measured by laser light diffraction was collected in the filter before ventilation.

Test Methods: Particle Size Analysis and Redispersibility for Polymer Dispersions and Redispersions of the RDP Samples An epoxy multilayer polymer particle dispersion sample was diluted in de-ionized (DI) water prior to analysis to avoid saturating the detector. Each spray dried epoxy powder was dispersed into alkaline water (DI water with 2 drops of 1 M NaOH solution, pH>10) at 1% solids wt. and vortexed for 30 seconds twice. Particle size was measured with a Beckman Coulter LS 13 320 Laser Light Diffraction Particle Size analyzer (Beckman Coulter, Inc., Brea Calif.), using an epoxy resin model predetermined by the instrument software. Solid content analysis was performed on an Ohaus MB45 (Ohaus Corporation, Parsippany, N.J.) moisture analyzer. To test redispersibility, a sample of the indicated multilayer polymer particle RDP an indicated additive was added into the particle dispersion before spray drying in the indicated amounts and redispersibility was measured by volumetric percentage of RDP particles below 2 μm in the redispersion after a period of 1 day at ambient temperature. An acceptable redispersibility reading is 50 wt. % or higher, preferably, 75 wt. % or higher, based on the total weight of particles.

Test Methods: Bulk Density, Open Porosity, and Water Pickup

Bulk density, open porosity, and water pickup measurements were conducted in accordance with ASTM C373-88 (1988, ASTM International, Conshohocken, Pa.). After curing 14 days at RT and standard pressure, the geopolymer samples were cut and ground to the size of 7 mm×7 mm×14 mm. The samples were put under vacuum for 30 min, then saturated with water for another 30 min, followed soaking them in water for 3 days. After soaking into water for 3 days, suspended weights and saturated weights were measured. In measuring saturated weight, the samples were removed from water, excess water was removed and then saturated weight was measured; in measuring suspended weight, each sample is suspended in a net in a beaker of water which is connected to a balance and the weight of the Sample is measured (number 00033360, Mettler-Toledo Inc., Columbus, Ohio). The samples were dried at RT overnight and then dry weights were measured. The bulk density, open porosity, and water pickup were determined from the information of measured suspended weight, saturated weight, and dry weight using the equations provided by ASTM C373-88. The measurements of weight were conducted using balance which can measure accurately to 4 decimal places (±0.0001 g).

TABLE 3

Summary Of RDP Examples

| RDP[1] | Polymer (pbw) | Dispersant | ASR shell | Redispersibility |
|---|---|---|---|---|
| A | DER661 Tg = 40° C. 100 part | MOWIOL 488 10 part | PMMA— PMAA (4:1) 20 part | 100% |
| B | DER667E/DER331 (55/45); Tg = 20° C. 100 part | MOWIOL 488 10 part E-SPERSE 100 2 part | PMMA— PMAA (4:1) 25 part | 100% |
| C | DER669E/DER331 (33/67); Tg = 5° C. 100 part | MOWIOL 488 10 part | PMMA— PMAA (4:1) 30 part | 100% |
| D | Styrene/butadiene/itaconic acid (IA) RDP (mean particle size 250 nm, Tg = 20° C.; IA 2.1 wt. % of mers) | — | — | 100% |

[1]RDPs A, B and C were prepared from Dispersions D-F in Table 2, respectively.

Preparation of Geopolymer/Epoxy composite materials: Class F flyash from anthracite and bituminous coal contains less than 20% CaO (PV-14A, Boral Materials Technologies, Mt. Pleasant, Tex.), type-C flyash pozzolanic from lignite or subbituminous coal contains more than 20% CaO, some alkali and sulfate (PV-20A, Boral Materials Technologies, Mt. Pleasant, Tex.), and any polymer additive indicated in the Examples A to M, below, were dry mixed in a 1000 mL plastic container using a high shear mixer (Model L1U08, LIGHTNIN, Rochester, N.Y., USA) first at 700 and then at 2000 rpm with mixing time of about 3 min. The indicated sodium silicate solution and water were added into the dry mixture and then finally mixed at 2000 RPM for about 3 min. Unless otherwise indicated, the sodium silicate solution was prepared by mixing 960.7440 g of commercial sodium silicate solution (Grade 52 Occidental Chemical Corporation, Dallas, Tex.) and 25.4595 g of sodium hydroxide pellets (NaOH, Fisher Scientific Inc., Fair Lawn, N.J.), it is comprised of Na$_2$O (15.541 wt. %), SiO$_2$ (32.538 wt. %) and H$_2$O (51.921 wt %). Indicated mixing formulations are shown in the Examples, below. Each of the finally mixed formulations were cast into a plastic container with diameter of 9 cm and height of 2 cm and then cured in open condition at room temp (RT) for 14 days. Half of each of the cured formulations was cut and ground into 7 mm×7 mm×14 mm cubes and then mechanically tested for compressive strength before water exposure. Compressive strength was measured by using Universal mechanical testing machine (Frame #5567, Instron Inc., Norwood, Mass., USA) set at a cross head speed of 0.254 mm/min (0.01 in/min). Average compressive strength was determined after testing 12~15 samples per test. The other half of each formulation Example was also cut and ground into 7 mm×7 mm×14 mm dimension and measured for dry weight (dry weight 1) and then soaked into water at RT for 3 days. After soaking into water for 3 days, suspended and saturated weights were measured; and then each tested Example was dried for another 24 hours at RT. The finally dried materials were measured for dry weight (dry weight 2), and then finally characterized for compressive strength after water exposure. Preferably, the epoxy-modified geopolymers have equal or higher compressive strength after water soaking than they do before water soaking, i.e. the strength is maintained at the same level or increases.

Example A 71.0 g of sodium silicate solution and 22.25 g of deionized (DI) water were added into a mixture of 89.5 g of Class C flyash and 89.5 g of Class F flyash. Water content=23.6 wt. %; Si/Al molar ratio of 2.42.

Example B 56.8 g of sodium silicate solution and 50.0 g of aqueous epoxy dispersion (Example E in Table 2, above) were added into a mixture of 71.6 g of Class C flyash and 71.6 g of Class F flyash. Water content=23.6 wt. %; Polymer content=8.15 wt. %; Si/Al molar ratio of 2.42.

Example C 56.8 g of sodium silicate solution and 29.62 g of DI water were added into a mixture of 71.6 g of Class C flyash, 71.6 g of Class F flyash, and 20.38 g of an epoxy multilayer polymer particle RDP (Example B in Table 3, above). Water content=23.6 wt. %; Polymer content=8.15 wt. %; Si/Al molar ratio of 2.42.

As shown in Table 4, below, addition of epoxy and acrylic at 8.15 wt. % as a dispersion in Comparative Example B to the geopolymer of Example A improved the compressive strength of cured geopolymer about 10% and led to a 21.2% increase in Strength after 3 days water exposure; on the other hand, addition of an equal amount of an epoxy multilayer polymer particle powder in inventive Example C improved the compressive strength of cured geopolymer by about 70% over the Example A materials. Also, the compressive strength of epoxy multilayer polymer particle powder containing geopolymer was increased by 52.5% when the composite was immersed in water for 3 days, whereas the geopolymer in Example A increased on 7.7% in strength after water immersion. The strength over porosity of the inventive Example C composition was about 1.64 (30.31/17.8), which is more than double the strength over porosity of Example A, indicating a wide formulation window. The epoxy multilayer polymer particle RDP exhibits better workability, more homogeneous mixing and improved strength in geopolymer compositions.

TABLE 4

Characterization of Epoxy Multilayer Polymer Particle-modified Geopolymer Composites

| Example | Open Porosity (%) | Bulk Density (g/cm$^3$) | Water Pickup (%) | Compressive Strength (MPa) | | Strength Change |
|---|---|---|---|---|---|---|
| | | | | Before water exposure[1] | After 3 days water exposure[1] | |
| A (control) | 18.7 | 1.85 | 10.10 | 11.63 ± 0.42 | 12.53 ± 0.53 | 7.7% increase |
| B (Comp) | 21.2 | 1.67 | 12.69 | 12.47 ± 0.29 | 15.11 ± 0.37 | 21.2% increase |
| C | 17.8 | 1.75 | 10.15 | 19.88 ± 0.70 | 30.31 ± 1.16 | 52.5% increase |

[1]Figures following the plus/minus sign (±) indicate standard deviation of all test events averaged to yield the reported result.
2. Epoxy dispersion B in Table 1 but without an ASR is not compatible with geopolymer precursors.

Following the formulation preparation procedure in Example C, geopolymer/polymer compositions were prepared with two polymer powders (epoxy multilayer polymer particle RDP B and polystyrene-butadiene RDP in Table 3, above) at two polymer addition levels (4.075 and 8.15 wt. % based on the total composite weight). Water contents in examples D, E and F are comparable to each other; and water contents in Examples G, H and I are comparable to each other. To maintain proper workability, extra water was added to the formulations of Examples G, H and I as indicated below; however, this increases porosity and is, thus, necessarily limited as much as possible.

Example D 71.0 g of sodium silicate solution was added into a mixture of 89.5 g of Class C flyash and 89.5 g of Class F flyash. Water content=14.7 wt. %; Si/Al molar ratio of 2.42.

Example E 68.107 g of sodium silicate solution and 1.502 g of DI water were added into a mixture of 85.853 g of Class C flyash, 85.853 g of Class F flyash and 10.187 g of SB RDP (Table 3). Water content=14.7 wt. %; Si/Al molar ratio of 2.42.

Example F 68.107 g of sodium silicate solution and 1.502 g of DI water were added into a mixture of 85.853 g of Class C flyash, 85.853 g of Class F flyash and 10.187 g of Epoxy RDP (Example B, Table 3). Water content=14.7 wt. %; Si/Al molar ratio of 2.42.

Example G 71.0 g of sodium silicate solution and 5.0 g of DI water were added into a mixture of 89.5 g of Class C flyash and 89.5 g of Class F flyash. Water content=16.4 wt. %; Si/Al molar ratio of 2.42.

Example H 65.214 g of sodium silicate solution and 8.004 g of extra DI water were added into a mixture of 82.206 g of Class C flyash, 82.206 g of Class F flyash and 20.375 g of SB RDP (in Table 3). Water content=16.4 wt. %; Si/Al molar ratio of 2.42.

Example I 65.214 g of sodium silicate solution and 8.004 g of extra DI water were added into a mixture of 82.206 g of Class C flyash, 82.206 g of Class F flyash and 20.375 g of epoxy multilayer polymer particle RDP (Example B in Table 3). Water content=16.4 wt. %; Si/Al molar ratio of 2.42.

As shown in Table 5, below, addition of S/B latex powder at 4 wt. % in comparative Example E reduced the compressive strength of geopolymer compositions in Comparative Example D by 28%, whereas the addition of the same amount of epoxy multilayer polymer particle powder in inventive Example F increased the compressive strength of the geopolymer composition by 27%. When more water loading was required in samples H and I containing 8.15 wt. % polymer, the addition of S/B latex powder at 8.15 wt. % to the geopolymer of comparative Example H reduced the compressive strength by 38%, whereas the addition of the same amount of epoxy multilayer polymer particle powder in Example I actually increased the compressive strength of the geopolymer composition of comparative Example G by 18%. Even at higher water loadings and higher porosities the, the epoxy multilayer polymer particle RDP and geopolymer composition of the present invention is substantially effective in improving the strength of geopolymer compositions. Also, the standard deviation of the strengths in the inventive epoxy multilayer polymer particle RDP containing compositions is dramatically lowered if compared to the geopolymer comparatives D and G with no RDP. Accordingly, the present invention enables a much wider formulation window for making geopolymer compositions.

TABLE 5

Characterization of Epoxy Multilayer Polymer Particle Modified Geopolymer

| Example | Additive | Open Porosity (%) | Bulk Density (g/cm$^3$) | Water Pickup (%) | Compressive strength (MPa) before water exposure[1] |
|---|---|---|---|---|---|
| D[2] (control) | None | 9.19 | 2.07 | 4.45 | 47.94 ± 12.82 |
| (control) | S/B latex powder at 4.07% | 17.00 | 1.81 | 9.37 | 32.68 ± 1.99 |
| F | Epoxy RDP-B at 4.07% | 11.73 | 1.95 | 6.01 | 56.67 ± 3.69 |
| G (control) | None | 14.09 | 1.92 | 7.74 | 32.62 ± 9.44 |
| H (control) | S/B latex powder at 8.15% | 16.56 | 1.79 | 9.25 | 20.25 ± 1.30 |
| I | Epoxy RDP-B at 8.15% | 24.16 | 1.59 | 15.17 | 38.42 ± 3.15 |

[1]Figures following the plus/minus sign (±) indicate standard deviation of all test events averaged to yield the reported result.
[2]Strength after 3 days water exposure was 44.59 ± 11.67 MPa (a 6.99% decrease).

Examples J, K, L and M

Various Geopolymer/Epoxy Compositions

Example J 68.107 g of sodium silicate solution and 1.502 g of DI water were added into a mixture of 85.853 g of Class C flyash, 85.853 g of Class F flyash and 10.187 g of epoxy multilayer polymer particle RDP (Example A, Table 3). Water content=14.7 wt. %; Si/Al molar ratio of 2.42.

Example K 68.107 g of sodium silicate solution and 1.502 g of DI water were added into a mixture of 85.853 g of Class C flyash, 85.853 g of Class F flyash and 10.187 g of epoxy multilayer polymer particle RDP (Example C, Table 3). Water content=14.7 wt. %; Si/Al molar ratio of 2.42.

Example L 70.29 g of sodium silicate solution and 1.502 g of DI water were added into a mixture of 88.605 g of Class C flyash, 88.605 g of Class F flyash and 2.50 g of epoxy multilayer polymer particle RDP (Example B, Table 3). Water content=14.7 wt. %; Si/Al molar ratio of 2.42.

Example M 69.580 g of sodium silicate solution and 1.502 g of DI water were added into a mixture of 87.710 g of Class C flyash, 87.710 g of Class F flyash and 5.00 g of epoxy multilayer polymer particle RDP (Example B Table 3). Water content=14.7 wt. %; Si/Al molar ratio of 2.42.

TABLE 6

Characterization of Epoxy-modified Geopolymer

| Example | Additive | Open Porosity (%) | Bulk Density (g/cm$^3$) | Water Pickup (%) | Compressive Strength (MPa) | |
|---|---|---|---|---|---|---|
| | | | | | Before water exposure[1] | After 3 days water exposure[1] |
| J | Epoxy RDP A at 4% | 9.82 | 1.98 | 4.96 | 46.50 ± 11.49 | 52.09 ± 10.76 |
| K (control) | Epoxy RDP C at 4% | 10.39 | 1.96 | 5.32 | 37.51 ± 15.00 | 40.28 ± 10.50 |
| L | Epoxy RDP B at 1% | 7.99 | 2.07 | 3.87 | 59.13 ± 11.11 | 54.89 ± 9.24 |
| M | Epoxy RDP B at 2% | 9.15 | 2.02 | 4.53 | 53.44 ± 13.62 | 47.84 ± 11.67 |

[1]Figures following the plus/minus sign (±) indicate standard deviation of all test events averaged to yield the reported result.

The epoxy multilayer polymer particle RDP with a Tg of 40° C. in Example J exhibits improved strength after water exposure, compared to before water exposure. Such strength is around 20% greater than the strength of the relevant comparative Example D composition after water exposure. The epoxy multilayer polymer particle RDP with a Tg of 20° C. at a low content of (1%) in Example L shows a 20% improvement in strength over the geopolymer of Comparative Example D, whereas the RDP at a content of 2 wt. % improves strength before water exposure by about 10%. The Example K shows that too soft an epoxy in the epoxy multilayer polymer particle RDP may adversely impact the strength of geopolymer compositions made therewith. The above Examples J, L and M show that even use of small amounts of epoxy multilayer polymer particle RDPs can lead to big improvements in Compressive strength; and use of above 3 wt. % of epoxy multilayer polymer particle RDP leads to improved compressive strength after 3 days of water exposure.

We claim:

1. A two-component composition for forming a geopolymer comprising a dry mix component of one or more aluminosilicate geopolymer precursor and one or more epoxy multilayer polymer particle redispersible polymer powder (RDP) having an epoxy resin core and an alkali soluble polymer shell, wherein the epoxy resin in the RDP has a calculated glass transition temperature ($T_g$) of from 7 to 45° C., and, as a separate component, one or more alkaline silicate geopolymer precursor, the total two-component compositions having from 80 to 99 wt. % of total geopolymer precursors and from 1 to 20 wt. % of total epoxy multilayer polymer particle RDP, all weights based on the total weight of solids.

2. The two-component composition as claimed in claim 1, wherein the composition comprises the one or more aluminosilicate geopolymer precursor and the one or more alkaline silicate geopolymer precursor in such proportions that the geopolymer resulting from the geopolymer precursors of the two-component composition comprises silicon and aluminum in an atomic mole ratio of from 1.63:1 to 5:1 and comprises alkali metals and aluminum in an atomic mole ratio of 0.5:1 and up to 3.5:1, all weights based on the total weight of solids.

3. The two-component composition as claimed in claim 2, wherein the composition comprises the one or more aluminosilicate geopolymer precursor and the one or more alkaline silicate geopolymer precursor in such proportions that the geopolymer resulting from the geopolymer precursors of the two-component composition comprises silicon and aluminum in an atomic mole ratio of from 1.8:1 to 4:1.

4. The two-component composition as claimed in claim 1, wherein the alkaline silicate geopolymer precursor component further comprises water such that when the dry mix component and the alkaline silicate geopolymer precursor component are combined they form a wet mortar having a water content of from 1 to 30 wt. %, all weights based on the total weight of the resulting geopolymer, RDP and water in the mortar.

5. The two-component composition as claimed in claim 4, wherein the wet mortar resulting from mixing the two-component composition with water has a water content of from 12 to 30 wt. %, all weights based on the total weight of the resulting geopolymer, RDP and water in the mortar.

6. The two-component composition as claimed in claim 1, wherein the epoxy multilayer polymer particle RDP further comprises a colloidal stabilizer chosen from polyvinyl alcohol or poly(vinyl pyrrolidinone) or a copolymer thereof, or a mixture thereof.

7. The two-component composition as claimed in claim 1, above, the alkali soluble polymer that comprises the polymer shell of the multilayer polymer particle RDP has a calculated Tg of 60° C. to 120° C.

8. The two-component composition as claimed in claim 1, wherein the epoxy resin in the epoxy multilayer particle RDP has a calculated glass transition temperature ($T_g$) of from 12.5 to 43° C.

9. The two-component composition as claimed in claim 1, wherein the alkali soluble polymer shell of the epoxy multilayer polymer particle RDP is a polymer of methyl methacrylate and methacrylic acid (PMMA/PMAA).

10. A method for making wet geopolymer composition from the composition as claimed in claim 1 comprising making a dry mix composition by mixing the epoxy multilayer polymer particle RDP with the aluminosilicate geopolymer precursor to form a dry mix; and, then adding the alkaline silicate component and water to form a mortar.

* * * * *